US008587829B2

(12) United States Patent
Horita

(10) Patent No.: US 8,587,829 B2
(45) Date of Patent: Nov. 19, 2013

(54) METHOD OF AND APPARATUS FOR CONVERTING COLORS

(75) Inventor: Shuhei Horita, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 1016 days.

(21) Appl. No.: 12/588,798

(22) Filed: Oct. 28, 2009

(65) Prior Publication Data

US 2010/0110456 A1 May 6, 2010

(30) Foreign Application Priority Data

Nov. 4, 2008 (JP) ................................ 2008-283503

(51) Int. Cl.
*H04N 1/60* (2006.01)

(52) U.S. Cl.
USPC ............ 358/1.9; 358/518; 358/523; 358/524; 358/529; 382/162; 382/167

(58) Field of Classification Search
USPC .......... 358/1.2, 1.9, 1.13, 128, 167, 518, 523, 358/524, 529; 382/128, 167, 162
See application file for complete search history.

(56) References Cited

U.S. PATENT DOCUMENTS 7,212,312 B2 * 5/2007 Motamed ....................... 358/1.9
7,298,527 B2 * 11/2007 Yabe .............................. 358/1.9
7,369,271 B2 * 5/2008 Itagaki ........................... 358/1.9
7,944,594 B2 * 5/2011 Ito et al. ......................... 358/518
2001/0038388 A1 * 11/2001 Shiraishi ....................... 345/589
2003/0123072 A1 * 7/2003 Spronk .......................... 358/1.9
2005/0018219 A1 * 1/2005 Senn et al. ..................... 358/1.8
2006/0262151 A1 * 11/2006 Chiwata .......................... 347/14
2007/0127783 A1 6/2007 Kuramoto et al.
2009/0027705 A1 1/2009 Ozaki et al.

FOREIGN PATENT DOCUMENTS

JP 2001-268381 A 9/2001
JP 2005-252985 A 9/2005
JP 2007-116465 A 5/2007
JP 2007-158824 A 6/2007
JP 2007-208492 8/2007
JP 2007-300206 A 11/2007

* cited by examiner

*Primary Examiner* — King Poon
*Assistant Examiner* — Allen H Nguyen
(74) *Attorney, Agent, or Firm* — Jean C. Edwards; Edwards Neils PLLC

(57) ABSTRACT

A standard density print profile capable of producing a print of standard densities is generated by a printing press set to standard density conditions, and a designated density print profile capable of producing a print of designated densities is generated by the printing press when the printing press is set to designated density conditions. A color conversion table capable of producing the print of the designated densities with the printing press set to the standard density conditions is generated using the standard density print profile and the designated density print profile. The colors of the image data are converted using the color conversion table.

11 Claims, 10 Drawing Sheets

METHOD OF AND APPARATUS FOR CONVERTING COLORS

CROSS-REFERENCE TO RELATED APPLICATION

This application is based upon and claims the benefit of priority from Patent Application No. 2008-283503 filed on Nov. 4, 2008, in the Japan Patent Office, of which the contents are incorporated herein by reference.

BACKGROUND OF THE INVENTION

1. Field of the Invention

The present invention relates to a method of and an apparatus for converting colors to produce a print of desired designated densities using a printing machine that has been set to standard density conditions.

2. Description of the Related Art

Prints are produced by generating original film plates in various colors including cyan (C), magenta (M), yellow (Y), and black (K), for example, producing PS plates (presensitized plates) from the original film plates by exposure and development, mounting the PS plates on a printing press such as a rotary press or the like, and adjusting printing conditions including the ink film thickness, the dampening water, the temperature, etc.

Therefore, complex steps are involved in producing prints. In order to produce a print in desired colors, it has been customary prior to the production of the print to generate a proof using a simple output device such as a monitor, a color printer or the like, and adjust printing conditions in order for the proof to have the desired colors of the print to be produced.

Japanese Laid-Open Patent Publication No. 2007-208492, for example, discloses a method of confirming the colors of a print before the print is produced by a printing press. According to the disclosed method, if the colors of a proof fall in an allowable range with respect to the colors of the print, then the print is produced by the printing press without changing platemaking data for generating PS plates and target densities to be set as printing conditions in the printing press. On the other hand, if the colors of the proof deviate from the allowable range with respect to the colors of the print, then the platemaking data are changed or a target mixed-color halftone density or a target halftone dot area ratio which is related to the target density as the printing condition, and thereafter a proof is produced again, the process being repeated until the print having the desired colors is produced.

The colors of a print are normally adjusted by the operator who adjusts the ink keys to change the densities of the inks. The process of changing the densities of the proof by changing the target mixed-color halftone density or the target halftone dot area ratio, and the process of changing the densities of the print using the ink keys tend to cause the operator who makes adjustments to develop different sensations about the colors. Therefore, it is highly difficult to produce a print having desired colors which match the proof. Standard densities for prints that are desired by users may differ from user to user. For changing standard densities, it is necessary to adjust the ink keys and then print a color chart again to generate an ICC profile again.

However, such a process is highly time-consuming because a color chart made up of many color patches has to be printed depending on the new standard densities and measure the colorimetric values of the color chart. In addition, the operator needs to be highly experienced for changing standard densities using the ink keys or the like.

When the standard densities of a printing press are changed using ink keys, the standard densities are set uniformly with respect to one ink key. For example, it is assumed that, as shown in FIG. 10 of the accompanying drawings, images 6*a*, 6*b* are printed on a printing sheet 4 by a printing press whose standard densities have been adjusted by a plurality of ink keys 2 that are arrayed in a direction perpendicular to the printing direction, indicated by the arrow, of the printing sheet 4. Though standard densities for the images 6*a*, 6*b* can be adjusted in the direction perpendicular to the printing direction, they cannot be adjusted in the printing direction, but remain uniform by the corresponding ink keys 2. Accordingly, the densities of parts of the images 6*a*, 6*b* which correspond to the positions of the same ink keys 2 along the printing direction cannot be adjusted individually using the ink keys 2.

SUMMARY OF THE INVENTION

It is an object of the present invention to provide a method of and an apparatus for converting colors to produce a print of desired densities easily without the need for adjusting a printing press, so that the above problems of the related art will be solved.

According to an aspect of the present invention, there is provided a method of converting colors of image data capable of producing a print of standard densities with a printing press set to standard density conditions and generating a print of desired designated densities with the printing press set to the standard density conditions, comprising the steps of generating a standard density print profile capable of producing the print of the standard densities with the printing press set to the standard density conditions, generating a designated density print profile capable of producing the print of the designated densities with the printing press when the printing press is set to designated density conditions, and converting the colors of the image data using the standard density print profile and the designated density print profile.

According to another aspect of the present invention, there is provided an apparatus for converting colors of image data capable of producing a print of standard densities with a printing press set to standard density conditions and generating a print of desired designated densities with the printing press set to the standard density conditions, comprising a color converter for converting the colors of the image data using a standard density print profile capable of producing the print of the standard densities with the printing press set to the standard density conditions, and a designated density print profile capable of producing the print of the designated densities with the printing press when the printing press is set to designated density conditions.

With the method and the apparatus according to the present invention, it is easy to produce a print of desired designated densities with the printing press set to the standard density conditions without the need for adjustments of the printing press, using a designated density print profile which is capable of producing a print of designated densities with the printing press that is set to designated density conditions, and a standard density print profile which is capable of producing a print of standard densities with the printing press that is set to standard density conditions.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
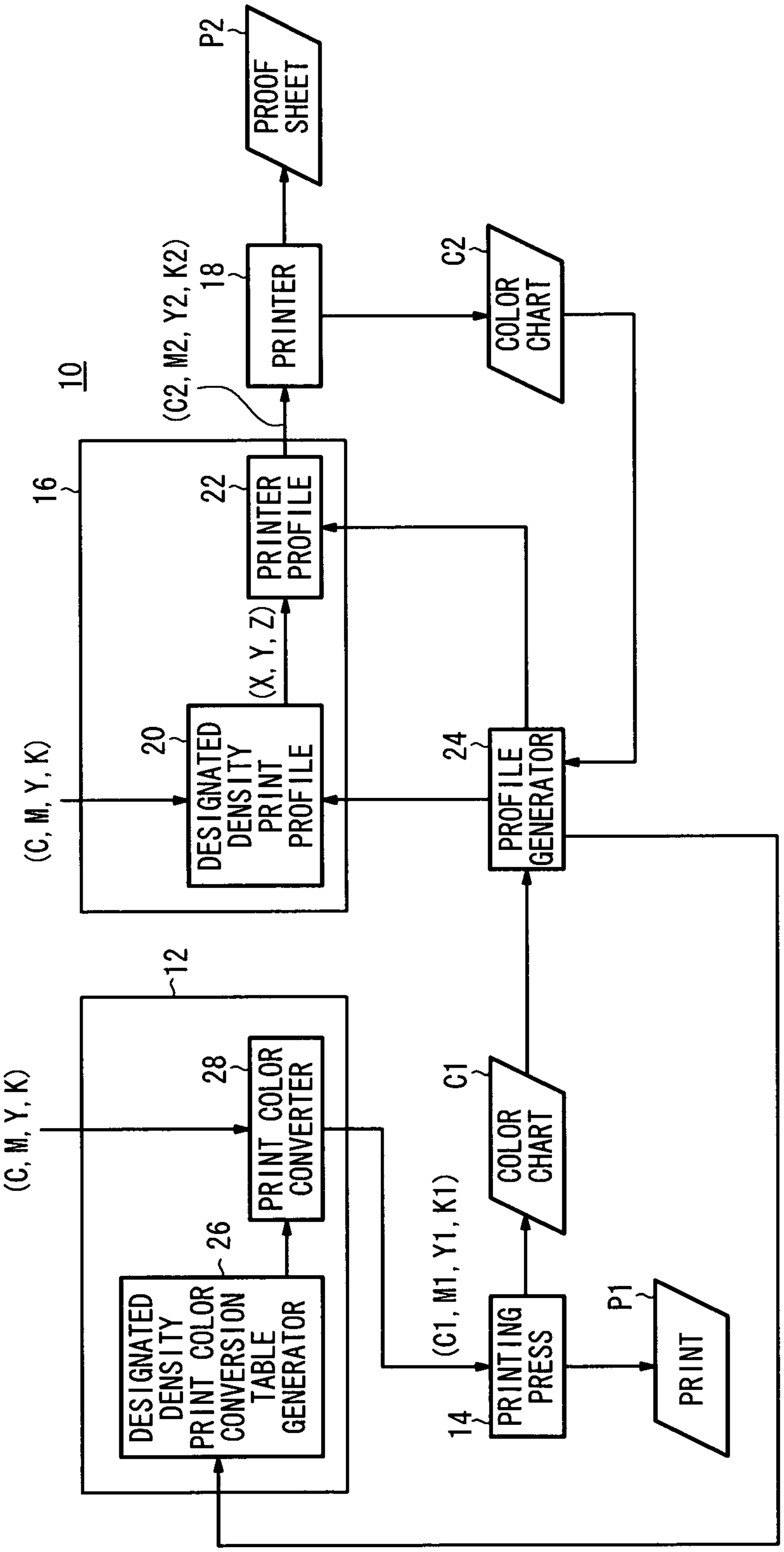
FIG. 1 is a block diagram of an arrangement of a print color predicting system according to an embodiment of the present invention.

Like or corresponding parts are denoted by like or corresponding reference characters throughout views.

FIG. 1 shows in block form a print color predicting system 10 according to an embodiment of the present invention, to which a method of and an apparatus for converting colors according to the present invention are applied. As shown in FIG. 1, the print color predicting system 10 comprises an editing device 12 for editing image data C, M, Y, K, a printing press 14 for producing a print P1 based on edited image data C1, M1, Y1, K1, a color converter 16 (proof generating color converter) for converting the image data C, M, Y, K into image data C2, M2, Y2, K2 for predicting colors, a printer 18 (proof generator) for generating a proof (proof sheet) P2 for the print P1 based on the image data C2, M2, Y2, K2, and a profile generator 24 for generating a designated density print profile 20 and a printer profile 22 which are incorporated in the color converter 16.

The editing device 12 comprises a designated density print color conversion table generator 26 for generating a designated density print color conversion table using the designated density print profile 20 generated by the profile generator 24 and a standard density print profile to be described later, and a print color converter 28 for converting the image data C, M, Y, K into the image data C1, M1, Y1, K1 based on which a print P1 of designated densities can be produced, using the designated density print color conversion table.

The designated density print profile 20 is a profile representative of the relationship between device-independent colorimetric values of the print P1 produced when the settings of the printing press 14 are set to designated density conditions for making the densities of the print P1 generated by the printing press 14 equal to designated densities, e.g., colorimetric values X, Y, Z or colorimetric values L*, a*, b* of the print P1, and the image data C, M, Y, K. The designated density print profile 20 is generated by the profile generator 24 based on existing image data C, Y, M, K and measured values of a color chart C1 that is produced from the image data C, M, Y, K by the printing press 14.

The printer profile (proof profile) 22 is a profile for converting device-independent colorimetric values, e.g., colorimetric values X, Y, Z or colorimetric values L*, a*, b*, into image data C, M, Y, K depending on the output characteristics of the printer 18 as a device. The printer profile 22 is generated by the profile generator 24 based on existing image data C, M, Y, K and measured values of a color chart C2 that is produced from the image data C, M, Y, K by the printer 18.

Each of the color charts C1, C2 may comprise a number of color patches of primary (monochromatic) through quaternary colors produced with inks (color materials) C, M, Y, K according to halftone dot percentages set at intervals in the range from 0% to 100%.

Figure 2:
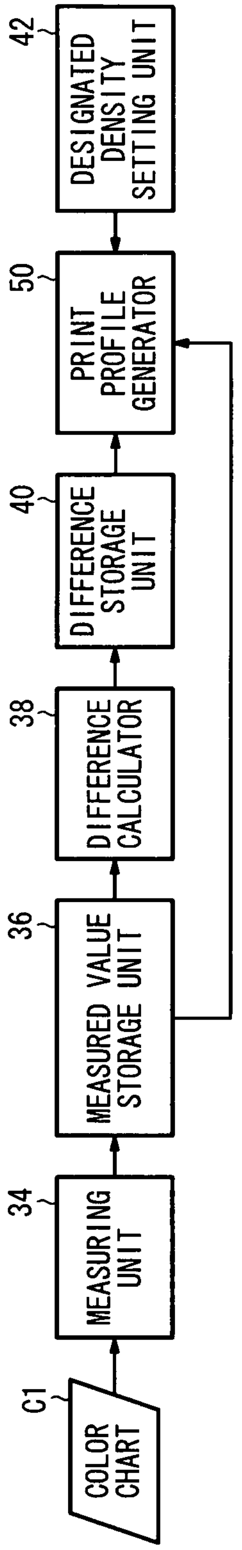
FIG. 2 is a block diagram of a function to generate a designated density print profile, of a profile generator of the print color predicting system shown in FIG. 1.

FIG. 2 shows in block form a function to generate the designated density print profile 20, of the profile generator 24. As shown in FIG. 2, the function to generate the designated density print profile 20 includes a measuring unit 34 for measuring the standard density spectral reflectances (standard measured values) of a color chart C1 (standard density color chart) generated by setting standard density conditions for obtaining standard densities in the printing press 14 and the changed density spectral reflectances (changed measured values) of color charts C1 (changed density color charts) generated by setting changing density conditions in the printing press 14, a measured value storage unit 36 for storing the measured spectral reflectances, a difference calculator 38 for calculating the spectral reflectance differences for the respective inks between the standard density spectral reflectances and the changed density spectral reflectances, a difference storage unit 40 for storing the spectral reflectance differences, a designated density setting unit 42 for setting the designated densities for the respective inks which are desired by the user, and a print profile generator 50 for generating a standard density print profile using the standard density spectral reflectances and also generating a designated density print profile using the standard density spectral reflectances, the spectral reflectance differences, and the designated densities.

The standard density conditions refer to conditions for adjusting printing conditions such as ink film thicknesses, etc. of the printing press 14 such that when the printing press 14 produces the color chart C1 with halftone dot % set to prescribed values for the inks C, M, Y, K, the densities of the inks of the color chart C1 will become the standard densities defined by the user which may be a printing company or the like. The changing density conditions refer to conditions for individually changing the densities of the inks C, M, Y, K from the standard densities by respective given amounts, and securing the densities of other inks than the inks to be changed to standard densities.

Figure 3:
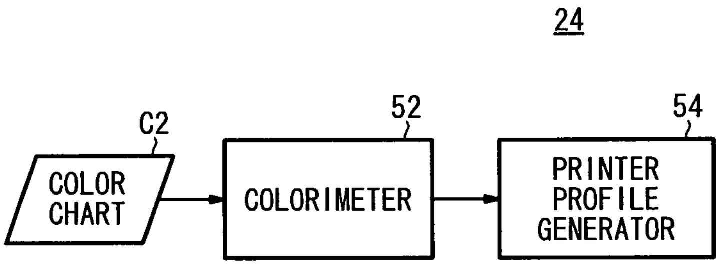
FIG. 3 is a block diagram of a function to generate a printer profile, of the profile generator of the print color predicting system shown in FIG. 1.

FIG. 3 shows in block form a function to generate the printer profile 22, of the profile generator 24. As shown in FIG. 3, the function to generate the printer profile 22 includes a colorimeter 52 for measuring colorimetric values, e.g., colorimetric values X, Y, Z or colorimetric values L*, a*, b*, of the color chart C2 generated by the printer 18, and a printer profile generator 54 for generating a printer profile 22 using the measured colorimetric values.

Figure 4:
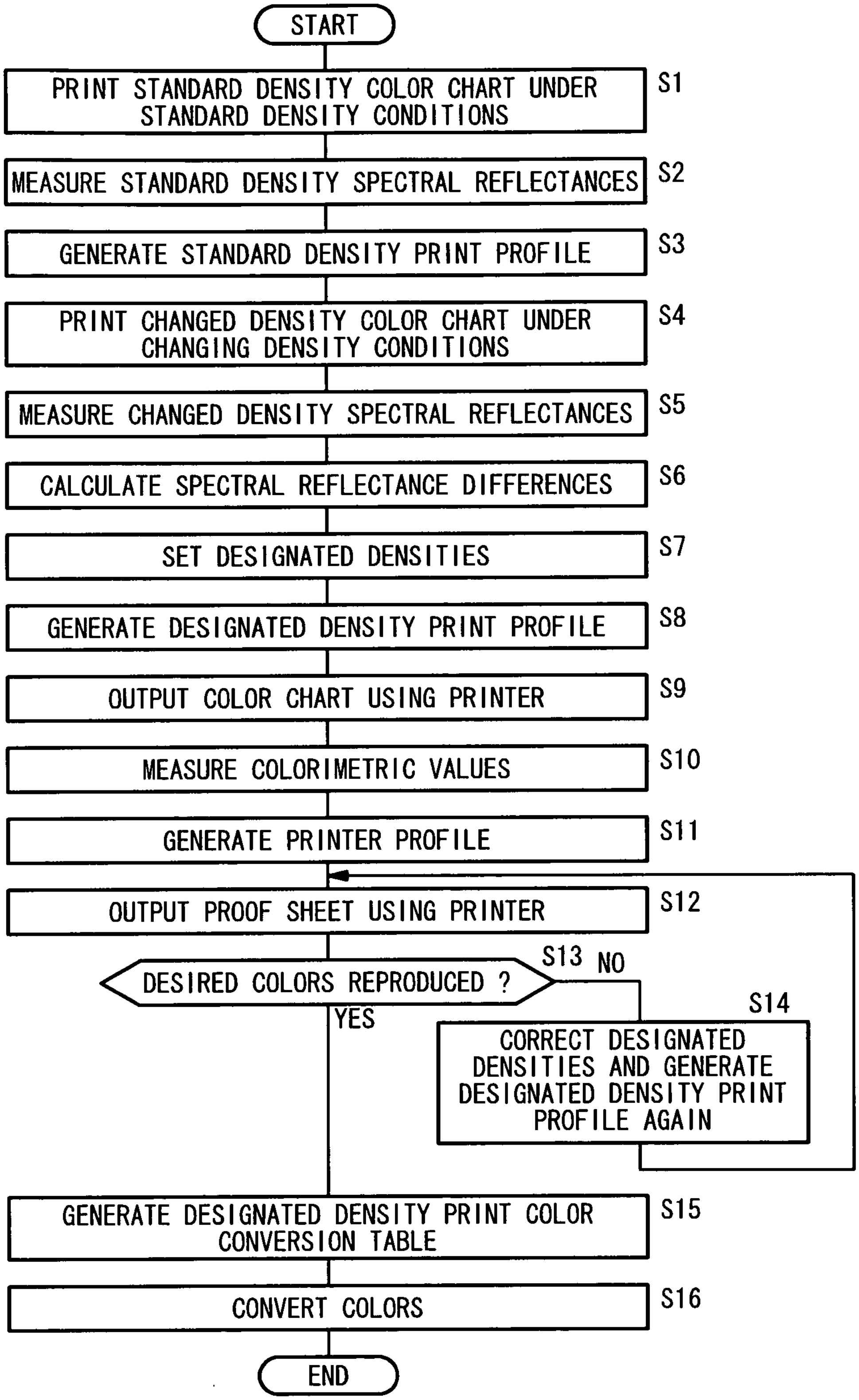
FIG. 4 is a flowchart of a color converting method.

The print color predicting system 10 according to the present embodiment is basically constructed as described above. A color converting method carried out by the print color predicting system 10 will be described below with reference to a flowchart shown in FIG. 4.

First, known image data C, M, Y, K are supplied to the printing press 14, which is set to the standard density conditions which make the monochromatic densities of color patches equal to standard densities Dstd and prints a color chart C1 (standard density color chart) (step S1). The color chart C1 comprises a plurality of color patches printed in respective halftone dot % of the image data C, M, Y, K at predetermined intervals in the range from 0% to 100%.

The color chart C1 generated by the printing press 14 that has been set to the standard density conditions is measured for standard density spectral reflectances Rstd by the measuring unit 34 (step S2). The measured standard density spectral reflectances Rstd are stored in the measured value storage unit 36.

The print profile generator 50 calculates colorimetric values X, Y, Z or colorimetric values L*, a*, b* from the standard density spectral reflectances Rstd, and generates a standard density print profile representative of the relationship between the image data C, M, Y, K and the colorimetric values X, Y, Z or colorimetric values L*, a*, b* (step S3).

Then, the standard density conditions of the printing press 14 are changed to changing density conditions for obtaining given changing densities, and the printing press 14 prints color charts C1 (changed density color charts) using the same image data C, M, Y, K at predetermined intervals in the range from 0% to 100% as those for printing the color chart C1 under the standard density conditions (step S4).

The changing density conditions are conditions for individually changing the standard densities Dstd of the color patches produced with the inks C, M, Y, K by given density changes for the respective inks, and securing the densities of those inks other than the changed inks to the standard densities Dstd, so that the densities are −0.2, −0.1, +0.1, and +0.2, for example, smaller or greater than the standard densities Dstd in terms of optical densities. Accordingly, there are 16 color charts C1 generated under the changing density conditions with the densities of the colors C, M, Y, K being set to the standard density Dstd−0.2, the standard density Dstd−0.1, the standard density Dstd+0.1, and the standard density Dstd+0.2, respectively.

The color charts C1 generated by the printing press 14 under the changing density conditions are measured for changed density spectral reflectances R1 by the measuring unit 34 (step S5). The measured changed density spectral reflectances R1 are stored in the measured value storage unit 36.

It is assumed, for example, that the standard density spectral reflectance Rstd under the standard density conditions of a monochromatic density patch of only C is represented by $R_{C(std)}$, the spectral reflectance under the standard density conditions of a monochromatic density patch of only M by $R_{M(std)}$, the changed density spectral reflectance R1 under changing density conditions for changing the density of the monochromatic density patch of only C by a given density change by $(R_{C(std)}+\Delta R_C)$, and the changed density spectral reflectance under changing density conditions for changing the density of the monochromatic density patch of only M by a given density change by $(R_{M(std)}+\Delta R_M)$. Then, the spectral reflectance $R_{CM}$ under the changing density conditions for changing the density of color patches of C and M by the same given density change is ideally expressed as follows:

$$
\begin{aligned}
R_{CM} &= (R_{C(std)} + \Delta R_C)\cdot(R_{M(std)} + \Delta R_M) \qquad (1)\\
&= R_{C(std)}\cdot R_{M(std)} + \\
&\quad \{R_{M(std)}\cdot(R_{C(std)} + \Delta R_C) - R_{C(std)}\cdot R_{M(std)}\} + \\
&\quad \{R_{C(std)}\cdot(R_{M(std)} + \Delta R_M) - R_{C(std)}\cdot R_{M(std)}\} + \Delta R_C\cdot\Delta R_M
\end{aligned}
$$

If the fourth term on the right side of the equation (1) is small enough to be regarded as 0, then the first term on the right side represents a standard density spectral reflectance Rstd produced when the color patches of C and M are generated under the standard density conditions, the second term on the right side represents the difference of a changed density spectral reflectance R1 produced by changing the density of only C of the color patches of C and M, from the standard density spectral reflectance Rstd, and the third term on the right side represents the difference of a changed density spectral reflectance R1 produced by changing the density of only M of the color patches of halftone dot percentages of C and M, from the standard density spectral reflectance Rstd.

Therefore, the changed density spectral reflectance $R_{CM}$ caused when the densities of both the colors C, M are changed can be determined by adding each spectral reflectance difference produced when one of the densities of the colors C, M is fixed and the other changed, to the standard spectral reflectance $R_{C(std)}\cdot R_{M(std)}$ under the standard density conditions.

Figure 5:
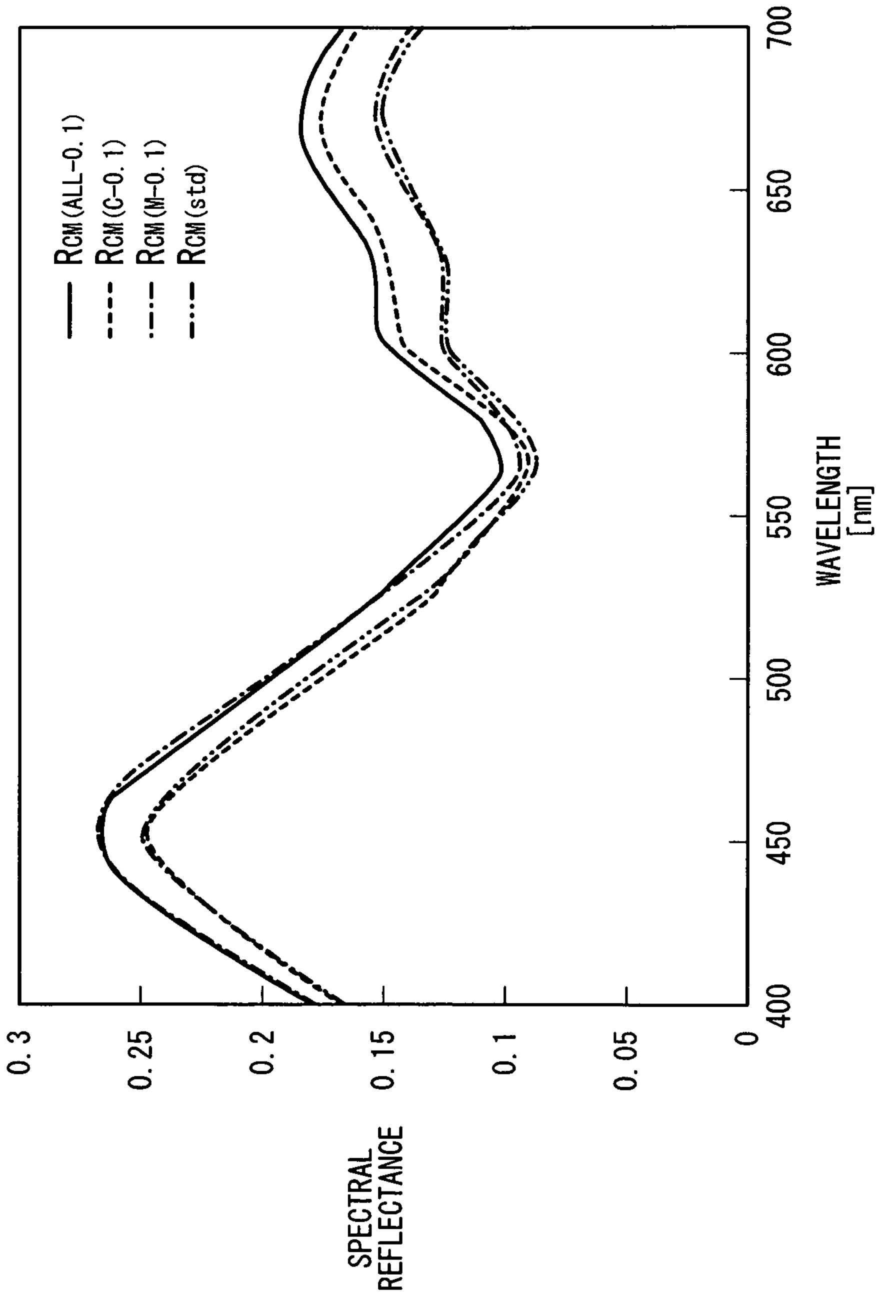
FIG. 5 is a diagram illustrative of spectral reflectances under standard density conditions and changing density conditions.

FIG. 5 shows measured data of the standard density spectral reflectance $R_{CM(std)}$ of color patches of halftone dot percentages of C 100% and M 100% generated under the standard density conditions, the changed density spectral reflectance $R_{CM(M-0.1)}$ of color patches generated under changing density conditions in which C 100% is secured to the standard density Dstd and only M 100% is changed to (standard density Dstd−0.1), the changed density spectral reflectance $R_{CM(C-0.1)}$ of color patches generated under changing density conditions in which M 100% is secured to the standard density Dstd and only C 100% is changed to (standard density Dstd−0.1), and the changed density spectral reflectance $R_{CM(ALL-0.1)}$ of color patches generated under changing density conditions in which both C 100% and M 100% are changed to (standard density Dstd−0.1).

Figure 6:
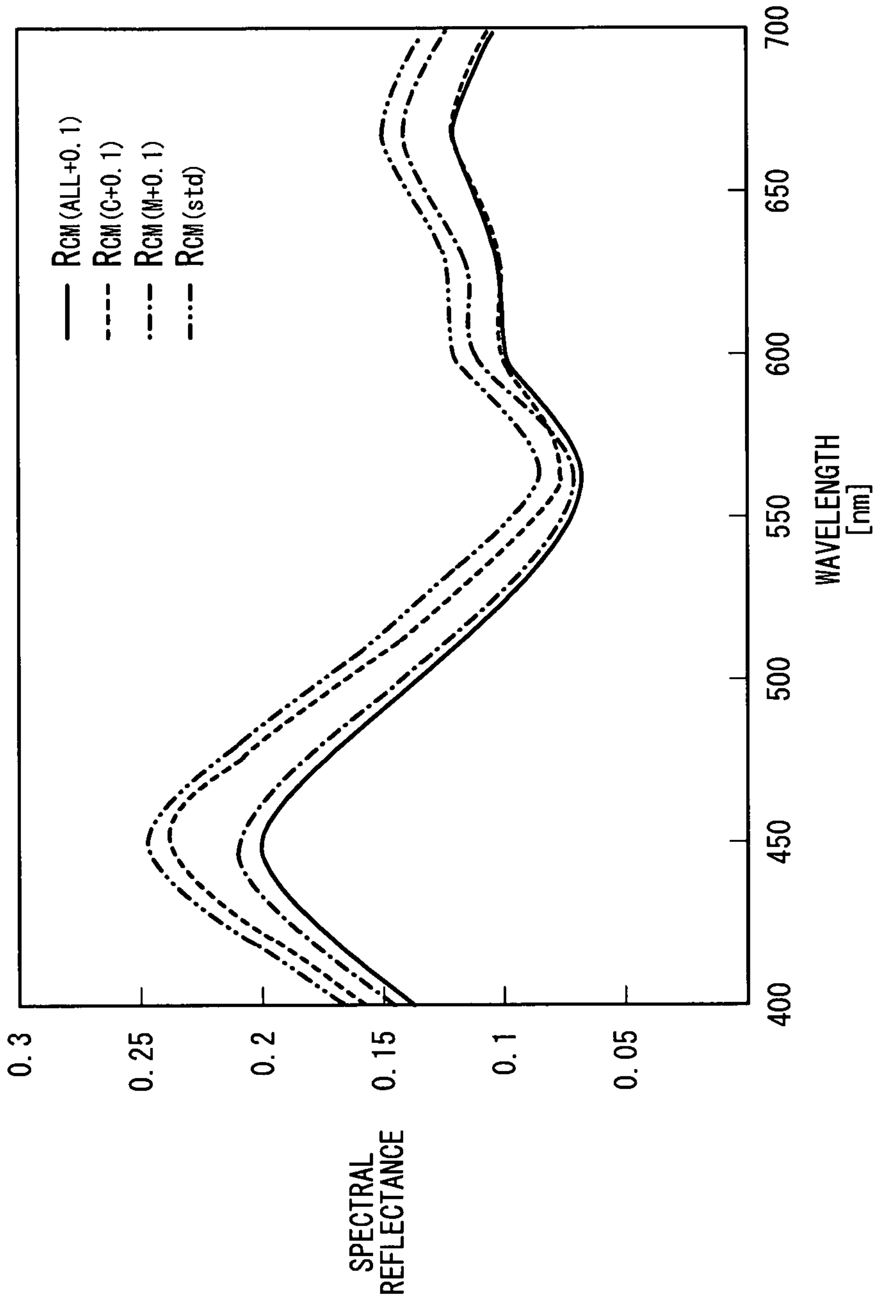
FIG. 6 is a diagram illustrative of spectral reflectances under standard density conditions and changing density conditions.

FIG. 6 shows measured data of the standard density spectral reflectance $R_{CM(std)}$ of color patches of halftone dot percentages of C 100% and M 100% generated under the standard density conditions, the changed density spectral reflectance $R_{CM(M+0.1)}$ of color patches generated under changing density conditions in which C 100% is secured to the standard density Dstd and only M 100% is changed to (standard density Dstd+0.1), the changed density spectral reflectance $R_{CM(C+0.1)}$ of color patches generated under changing density conditions in which M 100% is secured to the standard density Dstd and only C 100% is changed to (standard density Dstd+0.1), and the changed density spectral reflectance $R_{CM(ALL+0.1)}$ of color patches generated under changing density conditions in which both C 100% and M 100% are changed to (standard density Dstd+0.1).

The changed density spectral reflectance $R_{CM(ALL-0.1)}$ is approximately determined according to the equation:

$$R_{CM(ALL-0.1)} = R_{CM(std)} + (R_{CM(C-0.1)} - R_{CM(std)}) + (R_{CM(M-0.1)} - R_{CM(std)})$$

and the changed density spectral reflectance $R_{CM(ALL+0.1)}$ is approximately determined according to the equation:

$$R_{CM(ALL+0.1)} = R_{CM(std)} + (R_{CM(C+0.1)} - R_{CM(std)}) + (R_{CM(M+0.1)} - R_{CM(std)})$$

From the above results, a designated density spectral reflectance R, which is a spectral reflectance at the time C, M, M, K are changed to an arbitrary density under desired changing density conditions, is determined according to the following equation:

$$R=R_{std}+R_{\Delta C}+R_{\Delta M}+R_{\Delta Y}+R_{\Delta K} \quad (2)$$

based on the above equation (1), where $R_{std}$ represents a standard density spectral reflectance, $R_{\Delta C}$ a spectral reflectance difference at the time the density of only C is changed, $R_{\Delta M}$ a spectral reflectance difference at the time the density of only M is changed, $R_{\Delta Y}$ a spectral reflectance difference at the time the density of only Y is changed, and $R_{\Delta K}$ a spectral reflectance difference at the time the density of only K is changed.

The difference calculator 38 calculates the spectral reflectance differences $R_{\Delta C}$, $R_{\Delta M}$, $R_{\Delta Y}$, $R_{\Delta K}$ for the corresponding color patches between the standard density spectral reflectances Rstd measured in step S2 and the changed density spectral reflectances R1 measured in step S5 (step S6), and stores the calculated spectral reflectance differences $R_{\Delta C}$, $R_{\Delta M}$, $R_{\Delta Y}$, $R_{\Delta K}$ in the difference storage unit 40.

Then, designated densities for the print P1 to be generated by the printing press 14 are designated by the designated density setting unit 42 (step S7). The print profile generator 50 calculates a designated density spectral reflectance R according to the equation (2), using the standard density spectral reflectances Rstd stored in the measured value storage unit 36 and the spectral reflectance differences $R_{\Delta C}$, $R_{\Delta M}$, $R_{\Delta Y}$, $R_{\Delta K}$ corresponding to the designated densities stored in the difference storage unit 40.

The spectral reflectance differences $R_{\Delta C}$, $R_{\Delta M}$, $R_{\Delta Y}$, $R_{\Delta K}$ stored in the difference storage unit 40 are generated based on the density changes adjusted such that they are −0.2, −0.1, +0.1, and +0.2, for example, smaller or greater than the standard densities Dstd in terms of optical densities. If there are no data corresponding to the density changes which represent the differences between the standard densities and the designated densities, then the spectral reflectance differences $R_{\Delta C}$, $R_{\Delta M}$, $R_{\Delta Y}$, $R_{\Delta K}$ can be determined by interpolating the spectral reflectance differences $R_{\Delta C}$, $R_{\Delta M}$, $R_{\Delta Y}$, $R_{\Delta K}$ in the vicinity thereof. The spectral reflectance differences may be interpolated by a known process such as linear interpolation, spline interpolation, polynomial approximation, or the like.

The spectral reflectance differences $R_{\Delta C}$, $R_{\Delta M}$, $R_{\Delta Y}$, $R_{\Delta K}$ thus calculated are added to the standard density spectral reflectance Rstd in the equation (2) to calculate a designated density spectral reflectance R for the designated density.

If only the standard density Dstd of C is to be adjusted, then a designated density spectral reflectance R is calculated by using only the spectral reflectance difference $R_{\Delta C}$ of C and setting the other spectral reflectance differences $R_{\Delta M}$, $R_{\Delta Y}$, $R_{\Delta K}$ to 0. If the standard densities Dstd of C and M are to be adjusted, then a designated density spectral reflectance R is calculated by using the spectral reflectance differences $R_{\Delta C}$, $R_{\Delta M}$ of C and M and setting the other spectral reflectance differences $R_{\Delta Y}$, $R_{\Delta K}$ to 0.

When the standard densities Dstd of all the four colors C, M, Y, K are adjusted to respective designated densities, a designated density spectral reflectance R can be calculated according to the equation (2). However, in the event that the color patches to be processed for calculating a designated density spectral reflectance R are in three colors C, M, Y, the spectral reflectance density $R_{\Delta K}$ should ideally be 0 irrespective of density changes of K. Actually, the spectral reflectance density $R_{\Delta K}$ (may not be 0 due to printing and measuring variations.

Consequently, when the standard densities Dstd of all the four colors C, M, Y, K are adjusted to respective designated densities, in the event that the color patches to be processed for calculating a designated density spectral reflectance R are in three colors C, M, Y, it is desirable to calculate a designated density spectral reflectance R with the spectral reflectance difference $R_{\Delta K}$ being set to 0. Similarly, in the event that the color patches to be processed for calculating a designated density spectral reflectance R are in two colors C, M, it is desirable to calculate a designated density spectral reflectance R with the spectral reflectance differences $R_{\Delta Y}$, $R_{\Delta K}$ being set to 0.

The print profile generator 50 calculates colorimetric values X, Y, Z or colorimetric values L*, a*, b*, for example, from the designated density spectral reflectance R, and generates a designated density print profile 20 which represents the relationship between the colorimetric values X, Y, Z or colorimetric values L*, a*, b* and the image data C, M, Y, K (step S8). The designated density print profile 20 thus generated is set in the color converter 16.

Known image data C, M, Y, K are supplied to the printer 18, which outputs a color chart C2 made up of a plurality of color patches onto a recording medium (step S9) in the same manner as the color chart C1 is printed (step S1).

The color patches on the output color chart C2 are measured for colorimetric values, e.g., colorimetric values X, Y, Z or colorimetric values L*, a*, b*, by the colorimeter 52 (step S10). The printer profile generator 54 generates a printer profile 22 which represents the relationship between the measured colorimetric values X, Y, Z or colorimetric values L*, a*, b* and the image data C, M, Y, K used to generate the color chart C2 (step 511). The generated printer profile 22 is set in the color converter 16. Since the printer profile 22 does not depend on the changing density conditions, the printer profile 22 may be generated only once unless the conditions of the printer 18 are changed.

After the designated density print profile 20 and the printer profile 22 have been set in the color converter 16 as described above, desired image data C, M, Y, K are supplied to the color converter 16 for color conversion, and the printer 18 generates a proof P2 (step S12).

The color converter 16 converts the image data C, M, Y, K into colorimetric values X, Y, Z using the designated density print profile 20, for example, and thereafter converts the colorimetric values X, Y, Z into image data C2, M2, Y2, K2 using the printer profile 22. If the designated density print profile 20 has been determined with high accuracy, then the colors of the proof P2 generated by the printer 18 agree highly accurately with the colors of a color sample generated from the image data C, M, Y, K.

The user then visually compares the proof P2 and the color sample with each other or measures the proof P2 colorimetrically for comparison. If the desired colors are not reproduced on the proof P2 (step S13), then the designated densities are corrected, and the process of generating the designated density print profile 20 with the print profile generator 50 is repeated (step S14). When a proof P2 of desired colors is produced, the designated density print profile 20 that has been used is determined as a desired designated density print profile 20.

When the designated density print profile 20 is determined, the designated density print color conversion table generator 26 of the editing device 12 acquires the determined designated density print profile 20 and the standard density print profile generated in step S3 from the profile generator 24, and generates a designated density print color conversion table using these profiles (step S15). The generated designated density print color conversion table is set in the print color converter 28.

Figure 7:
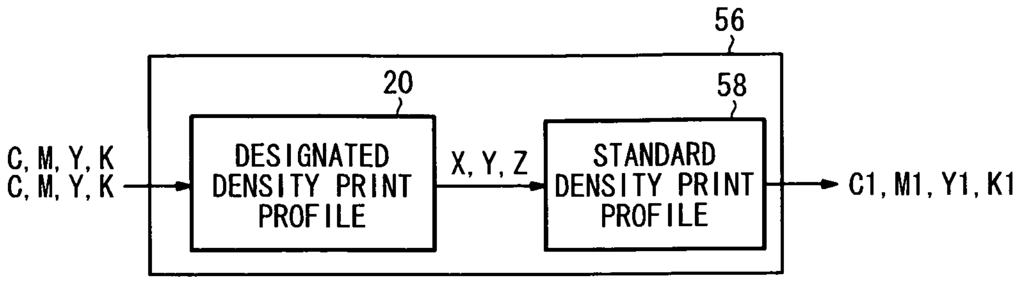
FIG. 7 is a functional block diagram of a designated density print color conversion table.

The editing device 12 converts desired image data C, M, Y, K into image data C1, M1, Y1, K1 using the designated density print color conversion table set in the print color converter 28 (step S16), and supplies the image data C1, M1, Y1, K1 to the printing press 14 which has been set to the standard density conditions. A designated density print color conversion table, which is designated by 56 in FIG. 7, operates on the image data C, M, Y, K as shown in FIG. 7. Specifically, the designated density print color conversion table 56 uses the designated density print profile 20 as an input profile which converts the image data C, M, Y, K into colorimetric values X, Y, Z for the printing press 14 that is set to designated density conditions for producing a print P1 of designated densities. The designated density print color conversion table 56 also uses a standard density print profile 58 as an output profile which converts the colorimetric values X, Y, Z from the designated density print profile 20 into image data C1, M1, Y1, K1 for the printing press 14 that is set to standard density conditions. The designated density print color conversion table 56 is a single color conversion table which comprises a combination of the designated density print profile 20 and the standard density print profile 58 that have the above functions. Alternatively, the designated density print profile 20 and the standard density print profile 58 may not be combined with each other, but may perform color conversions individually.

The printing press 14 produces a print P1 based on the converted image data C1, M1, Y1, K1. Though the printing press 14 has been set to the standard density conditions, it can produce a print P1 of designated densities without the need for changing its printing conditions to designated density conditions because the image data have been converted into the image data C1, M1, Y1, K1 by the designated density print profile 20 in order to produce a print P1 of designated densities. Therefore, the operator who handles the printing press 14 is not required to perform a process, which is complex and needs a lot of experience, for setting the printing press 14 to designated density conditions for achieving designated densities.

As shown in FIG. 7, the standard density print profile 58 which serves as part of the designated density print color conversion table 56 converts the colorimetric values X, Y, Z, i.e., three-variable data, into the image data C1, M1, Y1, K1, i.e., four-variable data. Therefore, even when the image data C, M, Y, K represent a black color wherein C=M=Y=0% and K=100%, the standard density print profile 58 may convert the colorimetric values X, Y, Z into equivalent image data C1, M1, Y1, K1 (C1≠0, M1≠0, or Y1≠0). In this case, colors other than black may appear on the print P1 due to color shifts or the like of the printing press 14.

Figure 8:
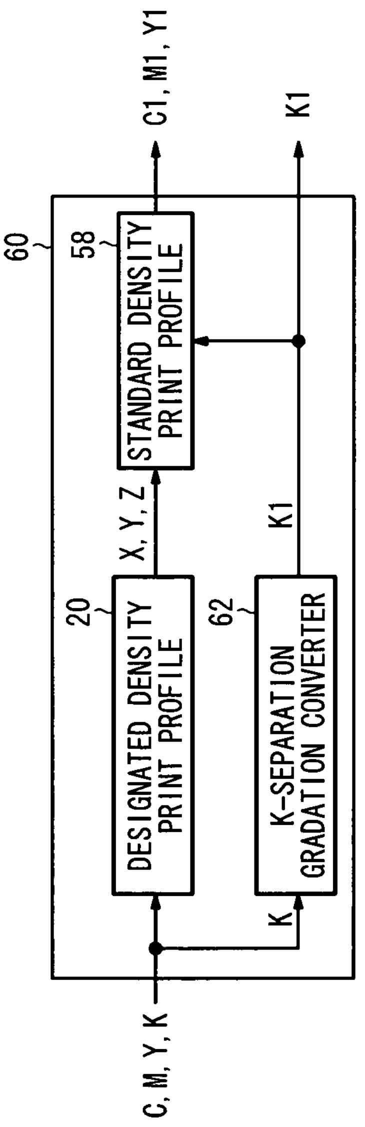
FIG. 8 is a functional block diagram of another designated density print color conversion table.

FIG. 8 shows another designated density print color conversion table 60 configured to solve the above problem. The designated density print color conversion table 60 determines image data C1, M1, Y1 and image data K1 independently of each other for thereby obtaining image data C1, M1, Y1, K1 with K1 being of a desired value.

Specifically, the designated density print color conversion table 60 includes the designated density print profile 20 which converts image data C, M, Y, K into colorimetric values X, Y, Z and a K-separation gradation converter 62 for converting the image data K into desired image data K1. The designated density print color conversion table 60 also includes the standard density print profile 58 which converts the colorimetric values X, Y, Z into image data C1, M1, Y1 based on the relationship between the colorimetric values X, Y, Z with fixed image data K1 and the image data C1, M1, Y1. The designated density print color conversion table 60 supplies the image data C1, M1, Y1, K1 to the printing press 14, which generates a print P1 wherein the desired black color is reproduced.

In the above description, the designated density print profile 20 is generated using the spectral reflectances of the color chart C1. However, the measuring unit 34 may comprise a spectral densitometer for measuring the spectral densities of the color chart C1, and a designated density print profile 20 may be generated from the spectral densities measured by the spectral densitometer.

Specifically, it is assumed, for example, that the spectral density under the standard density conditions of a color chart C1 of only C is represented by $D_{C(std)}$, the spectral density under the standard density conditions of a color chart C1 of only M by $D_{M(std)}$, the spectral density under given changing density conditions of a color chart C1 of only C by ($D_{C(std)}+\Delta D_C$), and the spectral density under the given changing density conditions of a color chart C1 of only M by ($D_{M(std)}+\Delta D_M$). Then, the spectral density $D_{CM}$ under the given changing density conditions of a color chart of C and M is expressed as follows:

$$
\begin{aligned}
D_{CM} &= (D_{C(std)} + \Delta D_C) + (D_{M(std)} + \Delta D_M) \\
&= (D_{C(std)} + D_{M(std)}) + \\
&\quad [\{(D_{C(std)} + D_{M(std)}) + \Delta D_C\} - (D_{C(std)} + D_{M(std)})] + \\
&\quad [\{(D_{C(std)} + D_{M(std)}) + \Delta D_M\} - (D_{C(std)} + D_{M(std)})]
\end{aligned} \tag{3}
$$

The first term on the right side of the equation (3) represents a standard spectral density produced when a color chart C1 of C and M is generated under the standard density conditions, the second term on the right side represents the difference of a spectral density produced by changing the density of only C of the color chart C1 of C and M to given changing density conditions, from the standard density conditions, and the third term on the right side represents the difference of a spectral density produced by changing the density of only M of the color chart C1 of C and M to given changing density conditions, from the standard density conditions.

Therefore, the spectral density $D_{CM}$ caused when the densities of both the colors C, M are changed can be determined by adding the difference produced when one of the densities of the colors C, M is fixed and the other changed, to the standard spectral density ($D_{C(std)}+D_{M(std)}$) under the standard density conditions, as with the spectral reflectance $R_{CM}$. Unlike the equation (1) for determining the spectral reflectance $R_{CM}$, the spectral density $D_{CM}$ can be determined with high accuracy as the equation (3) is free of the term representing the error $\Delta R_C \cdot \Delta R_M$.

As a result, in the profile generator 24, a target spectral density D at the time C, M, M, K are changed to an arbitrary density under desired changing density conditions is determined according to the following equation:

$$D = Dstd + D_{\Delta C} + D_{\Delta M} + D_{\Delta Y} + D_{\Delta K} \tag{4}$$

like the above equation (2), where Dstd represents a standard spectral density, $D_{\Delta C}$ a spectral density difference at the time the density of only C is changed, $D_{\Delta M}$ a spectral density difference at the time the density of only M is changed, $D_{\Delta Y}$ a spectral density difference at the time the density of only Y is changed, and $D_{\Delta K}$ a spectral density difference at the time the density of only K is changed. In the equation (4), the spectral density differences $D_{\Delta C}$, $D_{\Delta M}$, $D_{\Delta Y}$, $D_{\Delta K}$ are calculated according to the equation (2), thereby determining a designated density print profile 20 with respect to density changes from the standard densities Dstd.

In the event that the color patches to be processed for calculating the target spectral density D are in three colors C, M, Y, it is desirable to calculate the target spectral density D with the spectral density difference $D_{\Delta K}$ being set to 0. Similarly, in the event that the color patches to be processed for calculating the target spectral density D are in two colors C, M, it is desirable to calculate the target spectral density D with the spectral density differences $D_{\Delta Y}$, $D_{\Delta K}$ being set to 0.

A designated density print profile 20 may be generated using colorimetric densities or colorimetric values rather than the spectral reflectances or spectral densities.

In the above description, a designated density print profile 20 corresponding to density changes from the standard densities Dstd is determined. However, intermediate densities between the maximum and minimum densities of C, M, Y, K that can be printed by the printing press 14 may be set as standard densities, and a designated density print profile 20 may be generated based on a standard density color chart and a changed density color chart which have been generated according to the intermediate densities. The intermediate densities may be set as average values of the maximum and minimum densities or arbitrary values between the maximum and minimum densities.

Since the colors of the print P1 generated by the printing press 14 vary depending on the sheet of paper used for printing and the printing conditions including the inks, the dot gain, etc., the color converter 16 should desirably convert the image data in view of changes of such printing conditions.

The present invention is not limited to the illustrated embodiments, but may freely be changed or modified within the scope thereof.

Figure 9:
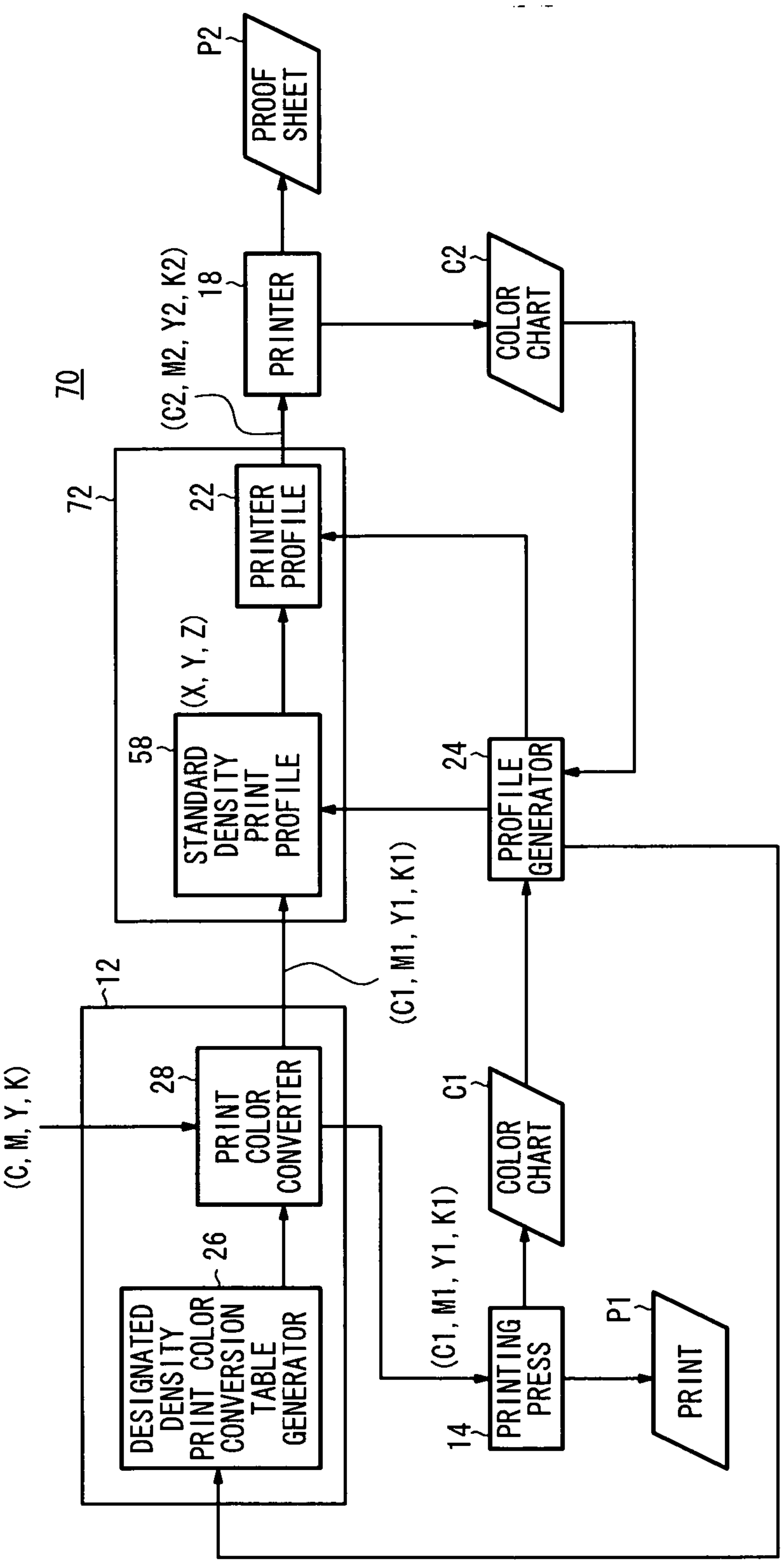
FIG. 9 is a block diagram of an arrangement of a print color predicting system according to another embodiment of the present invention.
Figure 10:
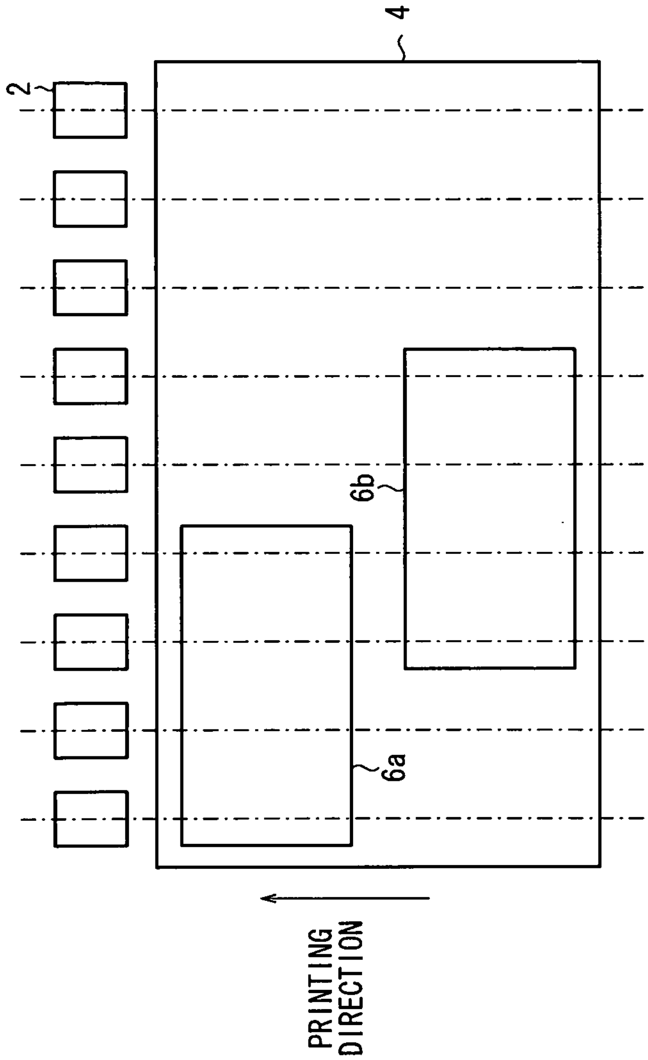
FIG. 10 is a diagram showing the relationship between ink keys and a plurality of images printed on a printing sheet.

FIG. 9 shows in block form an arrangement of a print color predicting system 70 according to another embodiment of the present invention. The print color predicting system 70 includes a color converter 72 (proof generating color converter) which has the standard density print profile 58 and the printer profile 22. The image data C1, M1, Y1, K1 generated by the print color converter 28 of the editing device 12 are supplied to the color converter 72, and a proof P2 is generated by the printer 18.

Specifically, any image data C, M, Y, K supplied to the editing device 12 are converted by the print color converter 28 into image data C1, M1, Y1, K1 for producing a print P1 of designated densities, and the image data C1, M1, Y1, K1 are supplied to the color converter 72. In the color converter 72, the standard density print profile 58 converts the image data C1, M1, Y1, K1 into colorimetric values X, Y, Z, which are converted into image data C2, M2, Y2, K2 by the printer profile 22. The image data C2, M2, Y2, K2 from the printer profile 22 are supplied to the printer 18, which generates the proof P2.

The user then visually compares the proof P2 and the color sample with each other. If the desired colors are not reproduced on the proof P2, then the designated densities are corrected, and the process of correcting the designated density print color conversion table to set in the print color converter 28 is repeated until a proof P2 of desired colors is obtained. When a proof P2 of desired colors is obtained, a designated density print color conversion table is determined.

For example, the print color predicting system 10 employs the printer 18 to generate the color chart C2 and the proof P2. However, the print color predicting system 10 may employ a color monitor, for example, to display the color chart C2 and the proof P2. In this case, the profile generator 24 colorimetrically measures the color chart C2 displayed on the color monitor, generates the designated density print profile 20 and a monitor profile based on the measured colorimetric values, and sets the designated density print profile 20 and the monitor profile in the color converter 16.

The designated density print profile 20 may be generated with respect to an arbitrary number of colors, e.g., two or more colors, rather than the four colors C, M, Y, K.

The color materials for use on the print P1 are not limited to inks, but may be toners, for example.

Although certain preferred embodiments of the present invention have been shown and described in detail, it should be understood that various changes and modifications may be made therein without departing from the scope of the appended claims.

What is claimed is:

1. A method of converting colors of image data capable of producing a print of standard densities with a printing press set to standard density conditions and generating a print of desired designated densities with the printing press set to the standard density conditions, comprising the steps of:

generating a standard density print profile capable of producing the print of the standard densities with the printing press set to the standard density conditions;

generating a designated density print profile capable of producing the print of the designated densities with the printing press when the printing press is set to designated density conditions; and converting the colors of the image data using the standard density print profile and the designated density print profile, wherein the designated density print profile is used as an input profile, the standard density print profile is used as an output profile, and the colors of the image data are converted using the input profile and the output profile, wherein the step of generating the standard density print profile comprises the steps of:

generating a standard density color chart with the printing press set to the standard density conditions;

measuring the standard density color chart to determine standard measured values; and generating the standard density print profile based on image data for generating the standard density color chart and the standard measured values, and wherein the step of generating the designated density print profile comprises the steps of:

changing the densities of color materials for producing the print individually by given amounts;

generating a changed density color chart with the printing press set to changing density conditions in which the densities of other color materials than the color materials whose densities are changed are secured to the standard density conditions;

measuring the changed density color chart to determine changed measured values;

adjusting the standard measured values with the differences between the standard measured values and the changed measured values for the color materials to which desired designated densities are set; and generating the designated density print profile based on the image data for generating the standard density color chart and the adjusted standard measured values.

2. A method according to claim 1, further comprising the steps of:

generating a proof profile in a proof generator for generating a proof for the print;

converting the colors of the image data using the designated density print profile and the proof profile;

generating the proof for the print with the proof generator based on the image data of the converted colors; and adjusting the designated densities to cause the proof to represent a desired image.

3. A method according to claim 2, wherein the designated density print profile is used as an input profile, the proof profile is used as an output profile, and the colors of the image data are converted using the input profile and the output profile.

4. A method according to claim 1, further comprising the steps of:

generating a proof profile in a proof generator for generating a proof for the print;

converting the colors of the image data which have been converted using the standard density print profile and the designated density print profile, using the standard density print profile and the proof profile;

generating the proof for the print with the proof generator based on the image data of the converted colors; and adjusting the designated densities to cause the proof to represent a desired image.

5. A method according to claim 4, wherein the standard density print profile is used as an input profile, the proof profile is used as an output profile, and the colors of the image data are converted using the input profile and the output profile.

6. An apparatus for converting colors of image data capable of producing a print of standard densities with a printing press set to standard density conditions and generating a print of desired designated densities with the printing press set to the standard density conditions, comprising:

a color converter for converting the colors of the image data using a standard density print profile capable of producing the print of the standard densities with the printing press set to the standard density conditions, and a designated density print profile capable of producing the print of the designated densities with the printing press when the printing press is set to designated density conditions, wherein the color converter uses the designated density print profile as an input profile, uses the standard density print profile as an output profile, and converts the colors of the image data using the input profile and the output profile, wherein generating the standard density print profile includes:

generation of a standard density color chart with the printing press set to the standard density conditions;

a measurement of the standard density color chart to determine standard measured values; and generation of the standard density print profile based on image data for generating the standard density color chart and the standard measured values, and wherein generating of the designated density print profile includes:

a change in the densities of color materials for producing the print individually by given amounts;

generation of a changed density color chart with the printing press set to changing density conditions in which the densities of other color materials than the color materials whose densities are changed are secured to the standard density conditions;

a measurement of the changed density color chart to determine changed measured values;

an adjustment of the standard measured values with the differences between the standard measured values and the changed measured values for the color materials to which desired designated densities are set; and generation of the designated density print profile based on the image data for generating the standard density color chart and the adjusted standard measured values.

7. An apparatus according to claim 6, further comprising a proof generating color converter for converting the colors of the image data using the designated density print profile and a proof profile in a proof generator for generating a proof for the print, and generating the proof with the proof generator based on the image data of the converted colors.

8. An apparatus according to claim 6, further comprising a proof generating color converter for converting the colors of the image data which have been converted using the standard density print profile and the designated density print profile, by using the standard density print profile and a proof profile in a proof generator for generating a proof for the print, and generating the proof with the proof generator based on the image data of the converted colors.

9. An apparatus according to claim 7, wherein the proof generator comprises a printer or a color monitor.

10. An apparatus according to claim 8, wherein the proof generator comprises a printer or a color monitor.

11. A method of converting colors of image data capable of producing a print of standard densities with a printing press set to standard density conditions and generating a print of desired designated densities with the printing press set to the standard density conditions, comprising the steps of:

generating a standard density print profile capable of producing the print of the standard densities with the printing press set to the standard density conditions;

generating a designated density print profile capable of producing the print of the designated densities with the printing press when the printing press is set to designated density conditions; and converting the colors of the image data using the standard density print profile and the designated density print profile, wherein the step of generating the standard density print profile comprises the steps of:

generating a standard density color chart with the printing press set to the standard density conditions;

measuring the standard density color chart to determine standard measured values; and generating the standard density print profile based on image data for generating the standard density color chart and the standard measured values, and wherein the step of generating the designated density print profile comprises the steps of:

changing the densities of color materials for producing the print individually by given amounts;

generating a changed density color chart with the printing press set to changing density conditions in which the densities of other color materials than the color materials whose densities are changed are secured to the standard density conditions;

measuring the changed density color chart to determine changed measured values;

adjusting the standard measured values with the differences between the standard measured values and the changed measured values for the color materials to which desired designated densities are set; and generating the designated density print profile based on the image data for generating the standard density color chart and the adjusted standard measured values.

* * * * *